(12) United States Patent
Sivakumar et al.

(10) Patent No.: US 8,576,875 B2
(45) Date of Patent: Nov. 5, 2013

(54) SYSTEMS AND METHODS OF IMPROVING PERFORMANCE OF TRANSPORT PROTOCOLS IN A MULTI-PATH ENVIRONMENT

(75) Inventors: Raghupathy Sivakumar, Alpharetta, GA (US); Aravind Velayutham, Atlanta, GA (US)

(73) Assignee: EMC Corporation, Hopkinton, MA (US)

( * ) Notice: Subject to any disclaimer, the term of this patent is extended or adjusted under 35 U.S.C. 154(b) by 1091 days.

(21) Appl. No.: 11/854,784

(22) Filed: Sep. 13, 2007

(65) Prior Publication Data

US 2008/0062879 A1 Mar. 13, 2008

Related U.S. Application Data

(60) Provisional application No. 60/844,226, filed on Sep. 13, 2006.

(51) Int. Cl.
*H04J 3/00* (2006.01)

(52) U.S. Cl.
USPC ........................................ 370/464

(58) Field of Classification Search
USPC ........... 709/250, 206, 230; 370/532, 417, 400
See application file for complete search history.

(56) References Cited

U.S. PATENT DOCUMENTS

| | | | | |
|---|---|---|---|---|
| 6,075,769 A * | 6/2000 | Ghanwani et al. | ............ | 370/229 |
| 6,078,564 A * | 6/2000 | Lakshman et al. | ............ | 370/235 |
| 6,577,596 B1 * | 6/2003 | Olsson et al. | ............ | 370/230 |
| 6,826,147 B1 * | 11/2004 | Nandy et al. | ............ | 370/229 |
| 7,092,357 B1 * | 8/2006 | Ye | ............ | 370/230 |
| 7,120,931 B1 * | 10/2006 | Cheriton | ............ | 726/13 |
| 2003/0103459 A1 * | 6/2003 | Connors et al. | ............ | 370/235 |
| 2003/0182437 A1 | 9/2003 | Kobayashi et al. | | |
| 2003/0223424 A1 * | 12/2003 | Anderson et al. | ............ | 370/392 |
| 2005/0071510 A1 * | 3/2005 | Belimpasakis | ............ | 709/250 |
| 2005/0102412 A1 * | 5/2005 | Hirsimaki | ............ | 709/232 |
| 2005/0246417 A1 * | 11/2005 | Raith et al. | ............ | 709/203 |
| 2006/0020707 A1 * | 1/2006 | Undery et al. | ............ | 709/230 |
| 2006/0092836 A1 * | 5/2006 | Kwan et al. | ............ | 370/229 |
| 2006/0193295 A1 * | 8/2006 | White et al. | ............ | 370/336 |
| 2006/0198300 A1 * | 9/2006 | Li et al. | ............ | 370/229 |

OTHER PUBLICATIONS

International Search Report and Written Opinion issued Feb. 1, 2008 in connection with corresponding PCT/US2007/78395.

* cited by examiner

*Primary Examiner* — Mark Rinehart
*Assistant Examiner* — Maharishi Khirodhar
(74) *Attorney, Agent, or Firm* — Ballard Spahr LLP (57) ABSTRACT

Devices, systems, and methods of improving transport protocol performance in a multi-path environment are disclosed. One network device comprises a transport-layer proxy; and a multi-path traffic distributor coupled to the transport-layer proxy. The transport-layer proxy is configured to receive packets, each associated with a transport-layer connection, from a transport-layer endpoint. The proxy is further configured to deliver at least a portion of the received packets to the multi-path traffic distributor. The multi-path traffic distributor is configured to: assign each of the delivered packets to one of a plurality of data flows, and to transmit each of the delivered packets on an outbound path associated with the assigned data flow.

13 Claims, 11 Drawing Sheets

SYSTEMS AND METHODS OF IMPROVING PERFORMANCE OF TRANSPORT PROTOCOLS IN A MULTI-PATH ENVIRONMENT

CROSS REFERENCE TO RELATED APPLICATIONS

This application claims the benefit of U.S. Provisional Application No. 60/844,226, filed Sep. 13, 2006, which is hereby incorporated by reference herein.

FIELD OF THE DISCLOSURE

The present disclosure relates to data communication, and more specifically, to communication of data over a plurality of parallel data communication paths.

BACKGROUND

The transport protocol known as Transmission Control Protocol (TCP) has been performing well for the past two decades as the de-facto transport protocol for reliable data delivery over the Internet. Although the algorithms used by TCP were designed to promote stability, reliability, and fairness on the Internet, these same algorithms lead to reduced TCP performance in the presence of certain conditions along the end-to-end path between the communicating systems. These characteristics, which include large bandwidth, large delay, and/or significant loss-rate, are becoming more common in today's Internet. Although the basic algorithms used by TCP have been modified over the years, significant change to these algorithms is unlikely, since there is such a large installed base of systems which use TCP.

Furthermore, despite the vast resources of most networks, the majority communicate data between two network entities in a sequential manner. For example, the widely used Internet Protocol (IP) supports only single-path routing between any two entities. Accordingly, data networks in general, and the Internet in particular, possess inherent characteristics that potentially allow for improvement in performance, cost, functionality, and flexibility by transcending the sequential data communication property. That is, performing data communication in parallel results in radical improvements in the capabilities of many packet data networks. Therefore, a need exists for these and other problems to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

SUMMARY

Devices, systems, and methods of improving transport protocol performance in a multi-path environment are disclosed. One network device comprises a transport-layer proxy; and a multi-path traffic distributor coupled to the transport-layer proxy. The transport-layer proxy is configured to receive packets, each associated with a transport-layer connection, from a transport-layer endpoint. The proxy is further configured to deliver at least a portion of the received packets to the multi-path traffic distributor. The multi-path traffic distributor is configured to: assign each of the delivered packets to one of a plurality of data flows, and to transmit each of the delivered packets on an outbound path associated with the assigned data flow.

DETAILED DESCRIPTION

Systems and methods of improving transport protocol performance in a multi-path environment are disclosed. The overall system architecture includes: a transport-layer proxy, configured to accelerate TCP connections through a combination of local ACKs, flow control, and connection management; and a multi-path traffic distributor, configured to perform multi-path resource aggregation. These components will be described in further detail below.

Several inventive techniques for integrating these two components are disclosed herein. One inventive technique is that data packets and close connection packets (e.g. TCP "FIN" control packet) are sent from the transport-layer proxy to the multi-path traffic distributor to be distributed among multiple wide-area-network (WAN) paths. Another inventive technique is that the multi-path traffic distributor communicates WAN path characteristics to the transport-layer proxy. These characteristics are provided the transport-layer proxy flow controller module so that the transport-layer proxy can perform appropriate flow control based on WAN conditions on the different paths. Yet another inventive feature involves a trigger manager, which provides a unified mechanism of choosing connections to be optimized by the transport-layer proxy, as well as those to be optimized by the multi-path traffic distributor.

Figure 1:
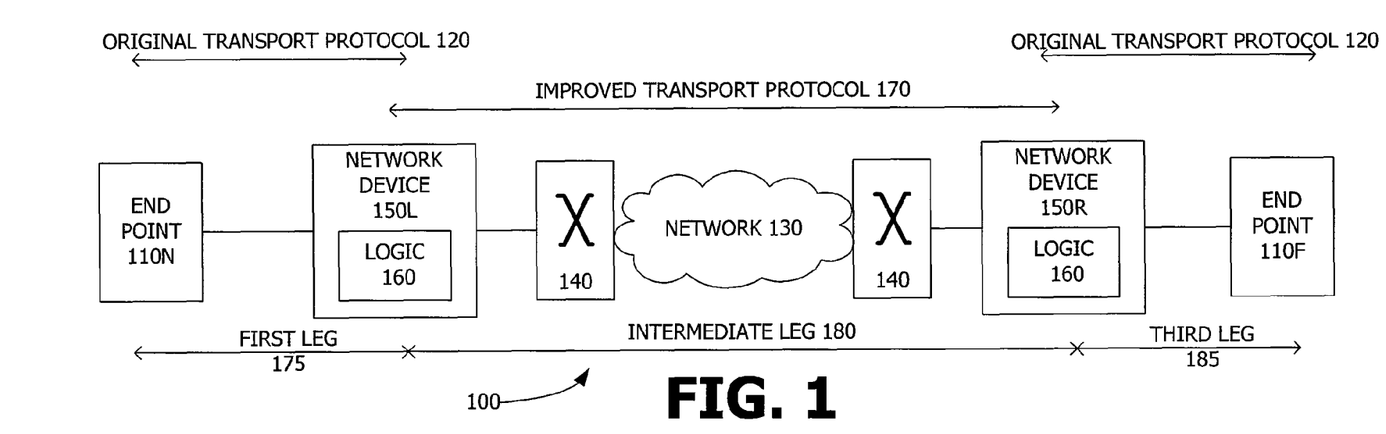
FIG. 1 is a block diagram of an environment in which one embodiment of a system and method for improving performance of transport protocols is located.

FIG. 1 is a block diagram of an environment in which one embodiment of a system and method for improving performance of transport protocols 100 is located. Endpoint devices 110 use a transport-layer (layer-4) protocol 120, and communicate with one another over a network 130. Although this disclosure discusses TCP as an exemplary transport-layer protocol, a person of ordinary skill in the art should recognize that the principles disclosed herein for improving performance of transport protocols also apply to other transport-layer protocols. Routers 140 transport traffic across network 130, which may involve the use of a network-layer (layer-3) protocol such as Internet Protocol (IP). Although the term "router" is used herein, a person of ordinary skill in the art should recognize that router 140 may take the form of a layer-3 switch instead.

Network devices 150 are located (logically) between endpoints 110 and routers 140. Each network device 150 includes logic for improving performance of transport protocols 160, which allows network device 150 to communicate with a peer network device 150 using an extended transport-layer protocol 170. Thus, a pair of endpoints 110 communicates through a pair of network devices 150.

System 100 thus includes two endpoints 110 and two network devices 150. The end-to-end connection can be divided into three legs: a first, or near-end, leg 175 between a near-end endpoint 110N and a local network device 150L; an intermediate leg 180 between local network device 150L and its peer, remote network device 150R; and a last, or far-end, leg 185 between the remote network device 150R and a far-end endpoint 110F.

Although network device 150 appears between endpoint 110 and router 140 in FIG. 1, this is a logical rather than a physical representation, indicating merely that packets pass through network device 150. As will be explained below, some embodiments of network device 150 are not actually placed inline between an endpoint 110 and router 140, but instead operate as an offline device hanging off router 140.

A person of ordinary skill in the art should appreciate that logic for improving performance of transport protocols 160 can be instantiated in several different ways. One example implements logic 160 in a standalone device 150 that sits between TCP communication end-device 110 and access router 140. Another instantiation of logic for improving performance of transport protocols 160 is within endpoint 110, for example, as a kernel driver sitting between the TCP and IP layer of the kernel protocol stack. As yet another example, logic for improving performance of transport protocols 160 can replace TCP as a transport layer in the protocol stack of the endpoint 110. Although only the standalone network device 150 is specifically discussed herein, all such instantiations are intended to be within the scope of this disclosure.

In some embodiments of network device 150, extended transport-layer protocol 170 is different than the transport-layer protocol 120 used by endpoints 110: the protocol used between an endpoint 110 and its corresponding network device 150 is the original transport-layer protocol 120; the protocol used between peer network devices 150 is the extended transport-layer protocol 170. In such embodiments, network device 150 acts as a transport-layer proxy for endpoint 110. In some proxy embodiments, endpoint 110 is unaware that network device 150 is using a different transport-layer protocol, in which case network device 150 is a transparent transport-layer proxy for endpoint 110. As will be described in further detail below, network device 150 maintains transparency by responding to packets sent by the TCP endpoints in such a way that the endpoints are aware of only the proxy as the other communicating endpoint and not the actual receiver.

In some embodiments, the links in network 130 exhibit different performance characteristics than the links to endpoints 110. For example, links to endpoints 110 may provide a relatively high-speed wired connection (e.g., 100 Mbit Ethernet) while links in network 130 may provide a lower-speed wired or wireless connection (e.g., T1, WiFi). The extended transport-layer protocol 165 is designed for the performance characteristics of the links between network devices 150.

The term "extended transport-layer packets" will be used hereinafter when referring to packets used by extended transport-layer protocol 170. A person of ordinary skill in the art should recognize that such a protocol typically includes packets that carry data (data packets), packets that acknowledge data (acknowledgement packets), and control packets that are used to setup teardown connections. Thus, reference will be made herein to "extended transport-layer data packets" and "extended transport-layer acknowledgment packets" and "extended transport-layer control packets". These packets correspond to, but are different than, the original transport-layer protocol. For example, a TCP Data packet and an extended transport-layer data packet both carry data, but the TCP Data packet originates from or is delivered to a TCP endpoint 110 while the extended transport-layer data packet is conveyed between transport-layer proxy peers 150.

In some embodiments, the extended transport-layer packets are formed by adding trailer fields to the original transport-layer protocol packets. For example, a TCP data packet is translated to an extended transport-layer data packet by appending a "protocol type" field of "extended transport-layer data", while a TCP control packet is translated to an extended transport-layer control packet by appending a "protocol type" field of "extended transport-layer control". This can be considered a form of encapsulation, but has the advantage of being transparent to the endpoints. In some cases, an extended transport-layer packet is conveyed alone, without encapsulation. In these cases, the Protocol Type field in the IP header may be set to a special value indicating the presence of the extended transport-layer protocol. That is, extended transport-layer protocol 170 is viewed by the IP, or network, layer as a protocol type, like TCP or UDP.

Although not illustrated in FIG. 1, a pair of endpoints 110 may include multiple connections between the peers, each of these connections passing through improved network devices 150L and 150R. In this case, a network device 150 decides, on a connection-by-connection basis, whether to use the extended transport-layer protocol 165 or the original transport-layer protocol 120 for the leg of the connection between network devices 150. In some embodiments, a user (e.g., a system administrator) decides which connections will use which transport-layer protocol, and configures the network device 150 accordingly.

Several configuration examples are: all connections from a particular endpoint 110 use extended transport-layer protocol 165; no connections from a particular endpoint 110 use extended transport-layer protocol 165; those connections from a particular endpoint 110 identified by a specific combination of header fields use extended transport-layer protocol 165; those connections from a particular endpoint 110 not identified by a specific combination of header fields do not use extended transport-layer protocol 165. A person of ordinary skill in the art should recognize that these are merely examples, and that many other techniques for determining which connections use the extended transport-layer protocol 165 are also possible.

Figure 2:
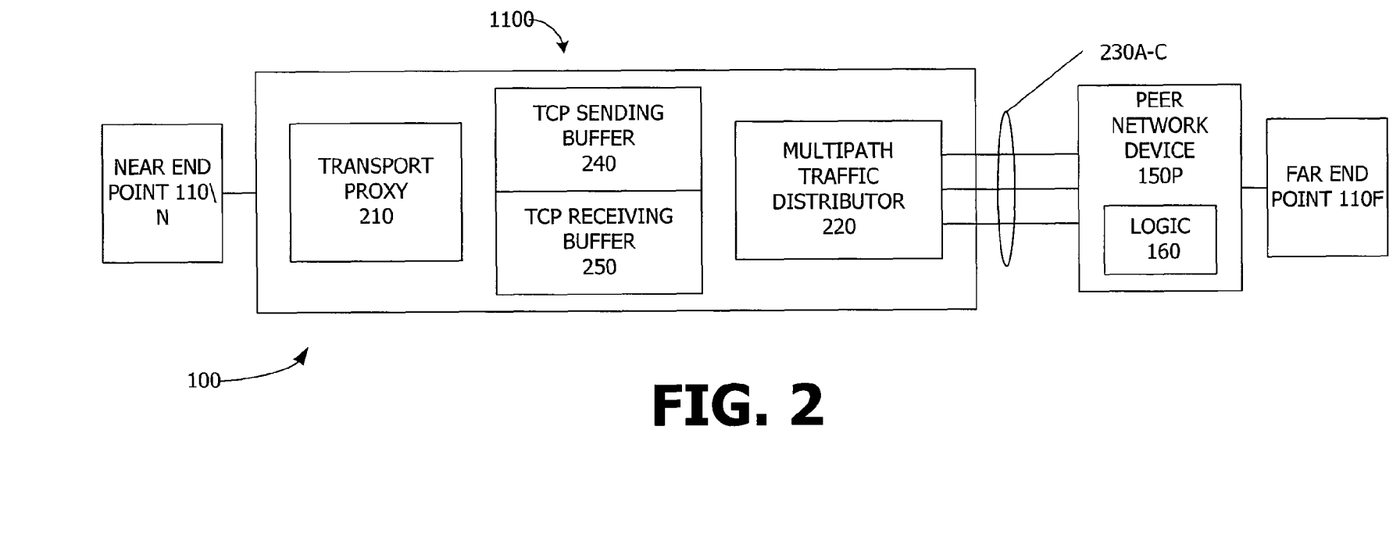
FIG. 2 is a block diagram illustrating selected components of logic for improving performance of transport protocols from FIG. 1.

FIG. 2 is a block diagram illustrating selected components of logic for improving performance of transport protocols 160 from FIG. 1. Transport-layer proxy 210 interacts with transport-layer protocol endpoint 110S and peer network device 150P to improve or accelerate TCP connections, using features such as local ACKs, flow control, and connection management. Some of these features were described in commonly assigned and co-pending patent application 820123-1010. Multipath traffic distributor 220 delivers packets to peer network device 150P, aggregating resources across multiple paths 230A-C provided by local network device 150.

Buffer 240 is used in sending data which local transport-layer proxy 210 receives from a (near-end) TCP endpoint 110N. This data is sent on to a peer transport-layer proxy (not shown) within peer network device 150P, for eventual delivery to (far-end) TCP endpoint 110F. Buffer 250 is used in sending data which transport-layer proxy 210 receives from the peer transport-layer proxy, originating from endpoint 110F. This data is sent on to (near-end) TCP endpoint 110N. Some embodiments of logic for improving performance of transport protocols 160 include an inventive feature whereby information about the status of buffers 240 and 250 is shared between transport-layer proxy 210 and multipath traffic distributor 220, and this buffer information is used to affect flow control and congestion control. This feature will be described in more detail below.

Figure 3A:
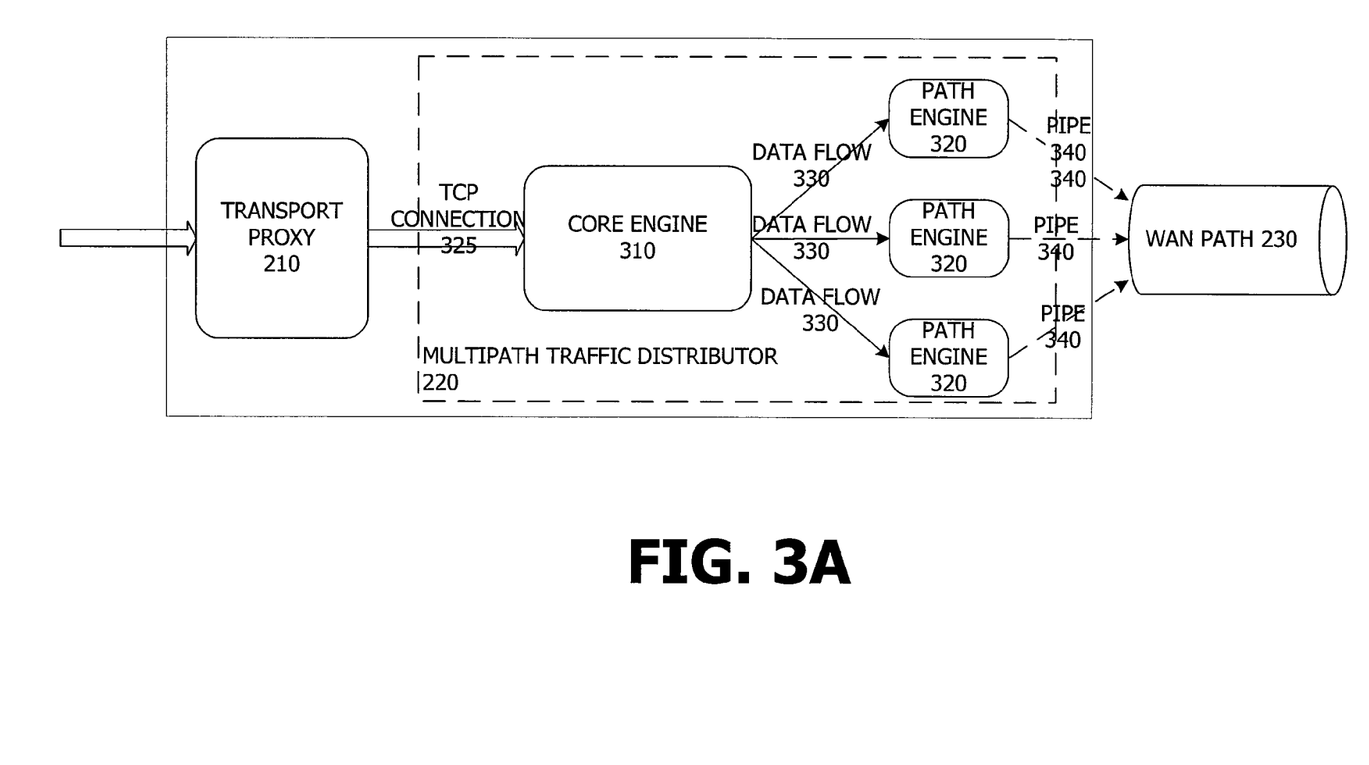
FIGS. 3A-3C are block diagram of various embodiments of the network device from FIG. 1.
Figure 3B:
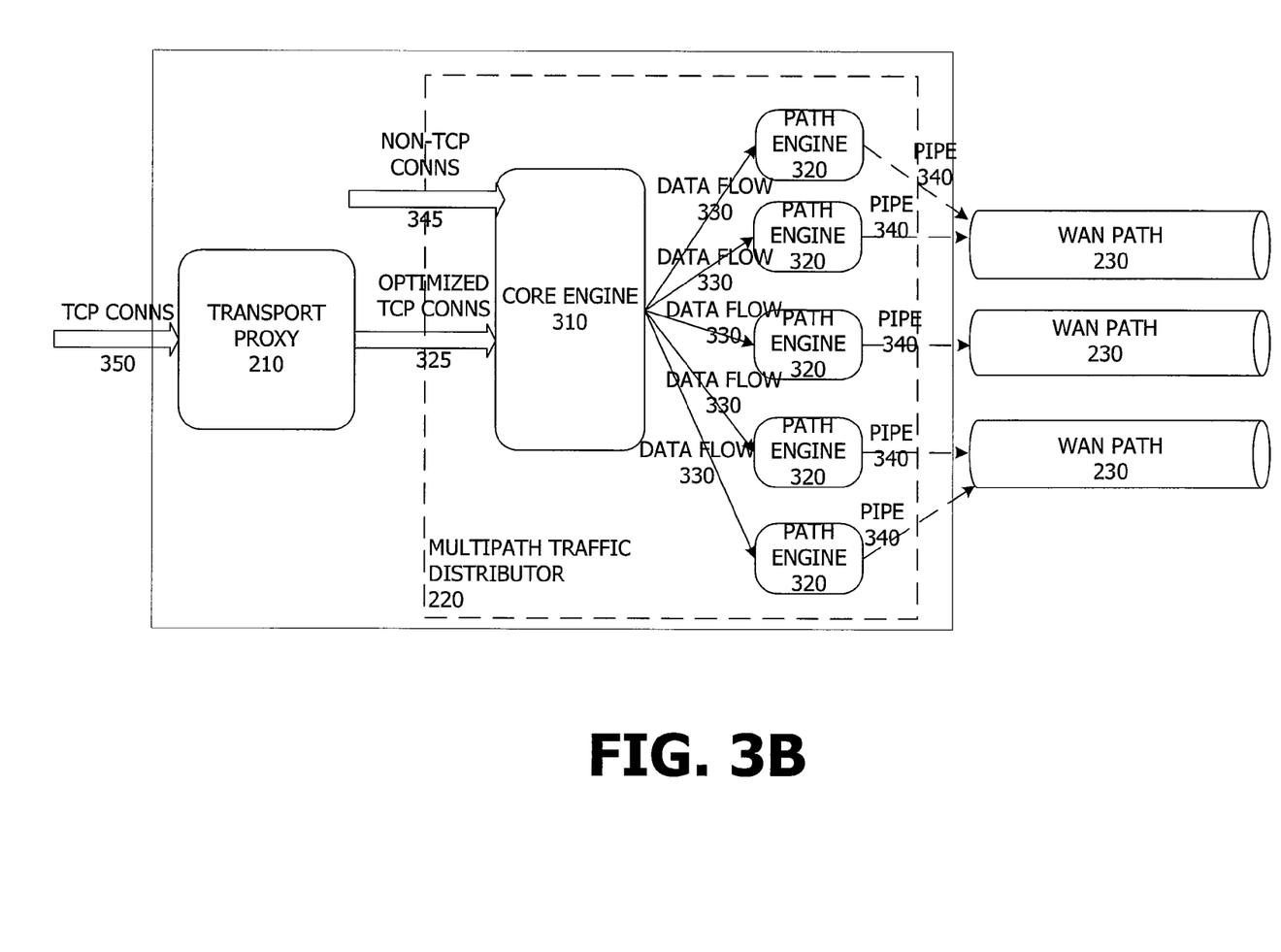
Figure 3C:
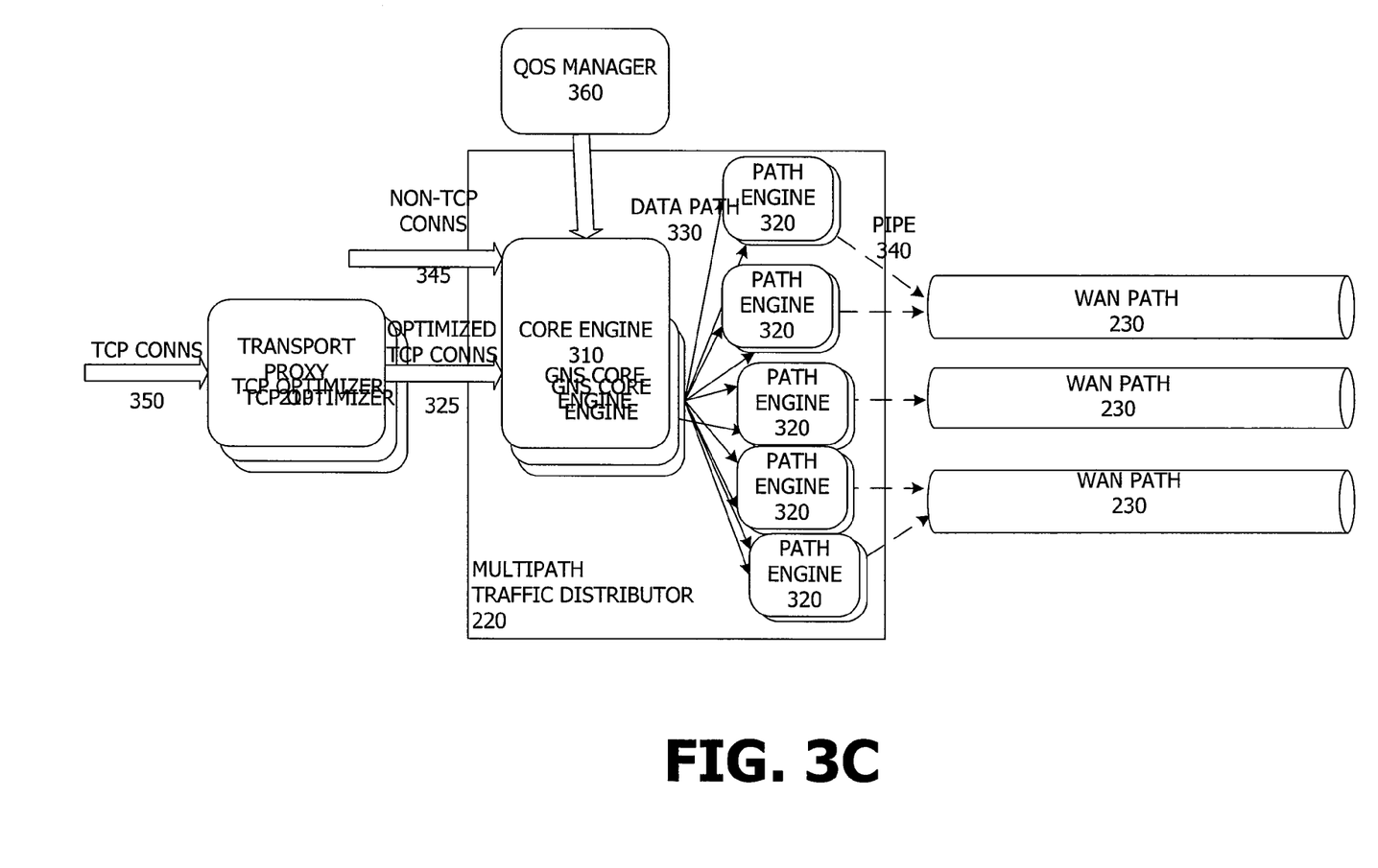

FIGS. 3A-3C are block diagram of various embodiments of network device 150. As described earlier, transport-layer proxy 210 focuses on interactions with (near-end) TCP endpoint 110N (not shown), while multipath traffic distributor 220 interfaces with a peer network device 150 located on the far network 130. In each of these embodiments, multipath traffic distributor 220 is partitioned into a core engine 310 which interfaces to transport-layer proxy 210, and multiple path engines 320 which interface to an outbound path 230. Core engine 310 multiplexes each optimized TCP connection 325 into one or more data flows 330, and distributes these flows data flows 330 among path engines 320. Each path engine 320 maintains a pipe 340 associated with a particular path 230, where a pipe 340 is a data structure used to store characteristics and state information for the path 230.

The embodiment of FIG. 3A supports a single far-side physical path 230 (where far-side is the side away from the near-end TCP endpoint 110N). Typically, the far-side path is a wide-area network (WAN) link, but a person of ordinary skill in the art should understand that the same principles can be applied to a local area network (LAN) link.

A brief overview of packet processing by these components follows, with details of packet processing to be described later in connection with FIGS. 4 and 5. When a packet is received, network device 150 first determines whether the packet belongs to an optimized TCP connection 325. If this packet in on an optimized connection 325, then transport-layer proxy 210 performs identifies the particular TCP connection 325 that the packet belongs, and determines if the packet is in sequence. If in sequence, transport-layer proxy 210 passes the packet on to core engine 310. Core engine 310 buffers the packet and hands off to one of the path engines 320, for transmission onto outbound path 230.

Since the embodiment of FIG. 3A contains only a single physical outbound path 230, all path engines 320 (through pipes 340) feed into the same single outbound path 230. However, the rate of transmission along each pipe 340 depends on the current state of congestion control, as maintained in the pipe data structure. Each path engine 320 also handles receipt of acknowledgements from outbound path 230 and performs rate control on its respective virtual path. One advantage of using multiple pipes over a single physical link relates to congestion control. Without multiple pipes, when congestion occurs, the sender data rate on the single link is reduced by, for example, 50%. However, when the same data is spread among 10 pipes and loss is randomly distributed among the pipes, then the sender data rate on each pipe is reduced by, for example, 50/10=5%.

The embodiment of FIG. 3B supports multiple outbound paths 230. Data packets arriving on TCP connections 350 and on non-TCP connections 345 are classified and processed first by a trigger manager (see FIGS. 9 and 10), then by transport-layer proxy 210, and then by core engine 310. Thus, while some TCP connections are not optimized by transport-layer proxy 210, core engine 310 processes all packets: optimized TCP connection 325 as well as non-optimized TCP connections and non-TCP connections such as connection 345. Thus, this embodiment is able to perform path-level optimization on all types of packets.

If a received packet in on an optimized connection, then transport-layer proxy 210 handles the packet, otherwise the packet bypasses transport-layer proxy 210 and is handled directly by core engine 310. Transport-layer proxy 210 identifies the particular TCP connection 325 that the packet belongs, and determines if the packet is in sequence. If in sequence, transport-layer proxy 210 passes the packet on to core engine 310.

Core engine 310 assigns each packet to one of the data flows 330, based on scheduling decisions made in tandem with the path engines 320. Each path engine 320 feeds into an outbound path 230, and more than one path engine 320 can feed into the same outbound path 230. Congestion control along each outbound path 230 is performed by the associated sender path engine 320, which in turn is assisted by acknowledgements received from a corresponding peer receiver-side path engine (not shown). Multiple pipes 340 are collected and demultiplexed by each outbound path 230 for transmission.

The embodiment of FIG. 3C supports multiple OUTBOUND paths 230 as well as quality of service (QoS). A QoS manager 360 arbitrates available resources between the different flows, and interfaces to core engine 310. The primary "control knob" used by QoS manager 360 to apply QoS to flows or traffic classes is the number of data flows 330 that are used. That is, QoS manager 360 operates by dynamically adapting the number of data flows 330 that are in use at any given point in time, to converge to QoS rules specified.

Similar to the embodiments of FIGS. 3A and 3B, data packets arriving on TCP connections 350 and on non-TCP connections 345 are classified and processed first by a trigger manager (see FIGS. 9 and 10), then by transport-layer proxy 210, and then by core engine 310. However, in the embodiment of FIG. 3C, QoS manager 360 operates in tandem with core engine 310 to determine the number of data flows 330 to be created, in a dynamic fashion, depending on the service achieved by the individual TCP connections 350, which belong to different QoS classes. Each path engine 320, while performing congestion control along its respective outbound path 230, also keeps track of the bandwidth achieved by its associated outbound path 230. By implementing a control loop with the QoS manager 360 and core engine 310, each path engine 320 is able to reach a steady state resource allocation for its flows. The arrival of acknowledgements from an outbound path 230 also indicates to the associated path engine 320 the successful receipt of data packet by the receiver, and is thus used to trigger reliability processing (explained below).

Figure 4:
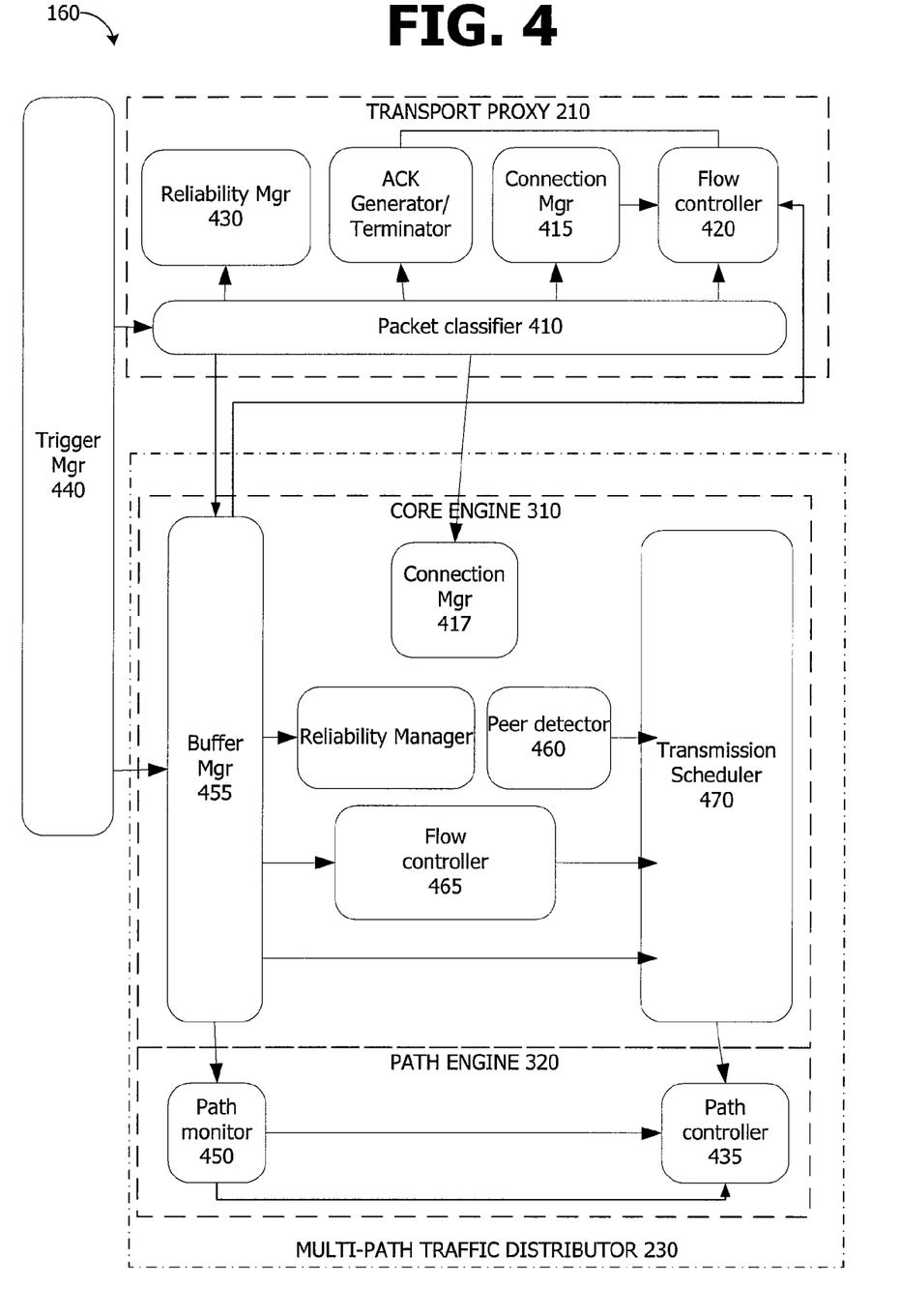
FIG. 4 is a block diagram showing selected components, in further detail, of logic for improving performance of transport protocols from FIG. 1.

FIG. 4 is a block diagram showing selected components of logic for improving performance of transport protocols 160 in further detail. Packet classifier 410 classifies transport-layer packets into DATA, ACK and other control packets, and takes appropriate actions according to the nature of the received packet. A connection manager 415 within transport-layer proxy 210, and a connection manager 417 within core engine 310 creates, maintains and deletes connection state, based on received packets associated with the connection. Acknowledgement generator/terminator 420 sends acknowledgements to a TCP sender endpoint 110, and captures acknowledgments from a TCP receiver endpoint 110. Proxy flow controller 425 performs flow control on the TCP sender endpoint 110, based on input from multipath traffic distributor 220. Reliability manager 430 performs loss detection and recovery between a receiving device 150 and the far-end TCP receiver endpoint 110F. Trigger manager 440 provides an interface for specifying those connections which are to be optimized by transport-layer proxy 210, and those which are to be distributed by multipath traffic distributor 220. In this manner, network device 150 can be configured to affect some TCP connections, and to leave others as is.

Path controller 435 determines the number of packets that are outstanding in any given path, based on the characterization of that path, and on information from congestion and reliability mechanisms. Path monitor 450 calculates bandwidth, loss and delay of the path (e.g., mean and variance). In some embodiments, these two functions are packaged into path engine 320 (FIG. 3), with the remaining functions packaged into core engine 310 (FIG. 3). Peer detector 460 detects whether configured peers devices 150 are active, and whether peers can be used as reflectors for overlay paths. Buffer manager 455 provides send and receive buffers (240 and 250 in FIG. 2). Distributor flow controller 465 performs flow control on OUTBOUND paths 230, based on input from buffer manager 455. Information from buffer manager 455 also controls the proxy flow controller 425. Transmission scheduler 470 transmits packets from send buffers 240, and other internal buffers, along paths 230. In some embodiments, this transmission function includes path striping. Further details on this striping feature, and other features of path controller 435 and path monitor 450, are described in commonly assigned and co-pending patent application Ser. No. 11/063,284 ("Systems and Methods for Parallel Communication"), filed Feb. 22, 2005.

Figure 5:
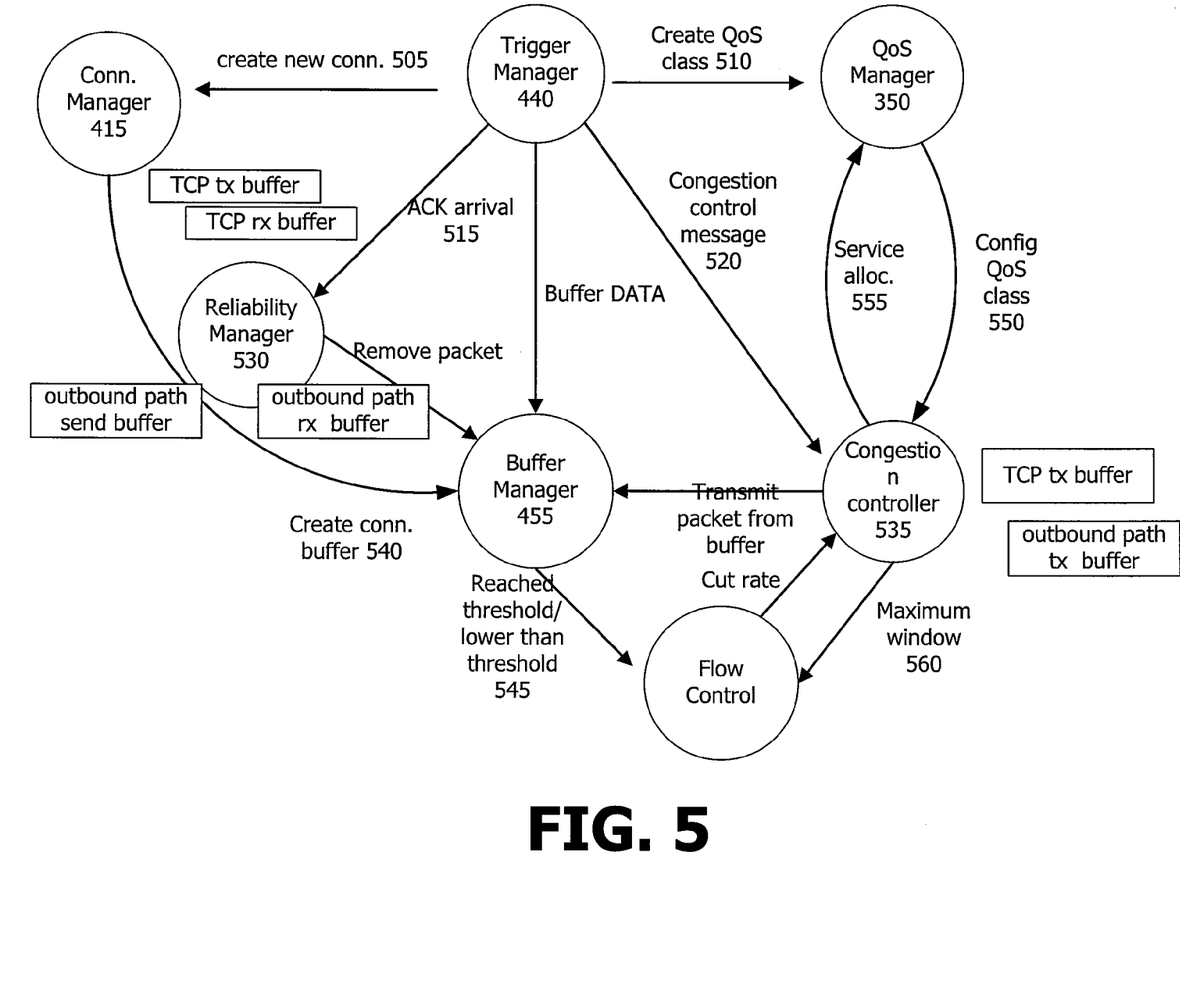
FIG. 5 is a data flow diagram showing interactions between the various components of logic for improving performance of transport protocols from FIG. 1.

FIG. 5 is a data flow diagram showing interactions between the various components of logic for improving performance of transport protocols 160. Trigger manager 440 performs preliminary classification of incoming packets, and interfaces with various other components. Trigger manager 440 indicates to connection manager 415 the creation (505) of a new connection, upon arrival of a packet that matches a specific configured trigger. Trigger manager 440 also communicates to QoS manager 360 the creation (510) of any new QoS class created within a trigger. Upon packet classification, trigger manager 440 indicates the arrival of data acknowledgment (515) and congestion control messages (520) to the reliability manager 530 and the congestion controller 535, respectively. On receipt of the new connection message from the trigger manager, connection manager 415 creates new connection state and also calls buffer manager 455 to create buffer state (540). This buffer state is maintained until connection manager 415 terminates the connection and deletes the state. Note that connection manager 415, as mentioned earlier, manages the creation, maintenance and termination of both TCP connections as well as path optimizer connections. In a near-end sending network device 150, buffer manager 455 monitors buffer occupancy and interfaces with proxy flow controller 425 to perform rate control on near-end TCP sender endpoint 110N, by indicating (545) to proxy flow controller 425 whenever the buffer occupancy exceeds a specific high-threshold or when it is lower than the low-threshold. In a far-end receiving network device 150, buffer manager 455 coordinates with distributor flow controller 465 to control the rate of the sender-side transport-layer proxy 210. QoS manager 360 interfaces with congestion controller 535 to configure (550) a QoS class which contains the number of data paths in use to achieve the required service allocation. The number can be increased or decreased dynamically. Congestion controller 535 interfaces with QoS manager 360 to control (555) the service allocation achieved for each service class. Congestion controller 535 also indicates (560) to proxy flow controller 425 the maximum window that has been received through the congestion control messages (520) from trigger manager 440.

Figure 6:
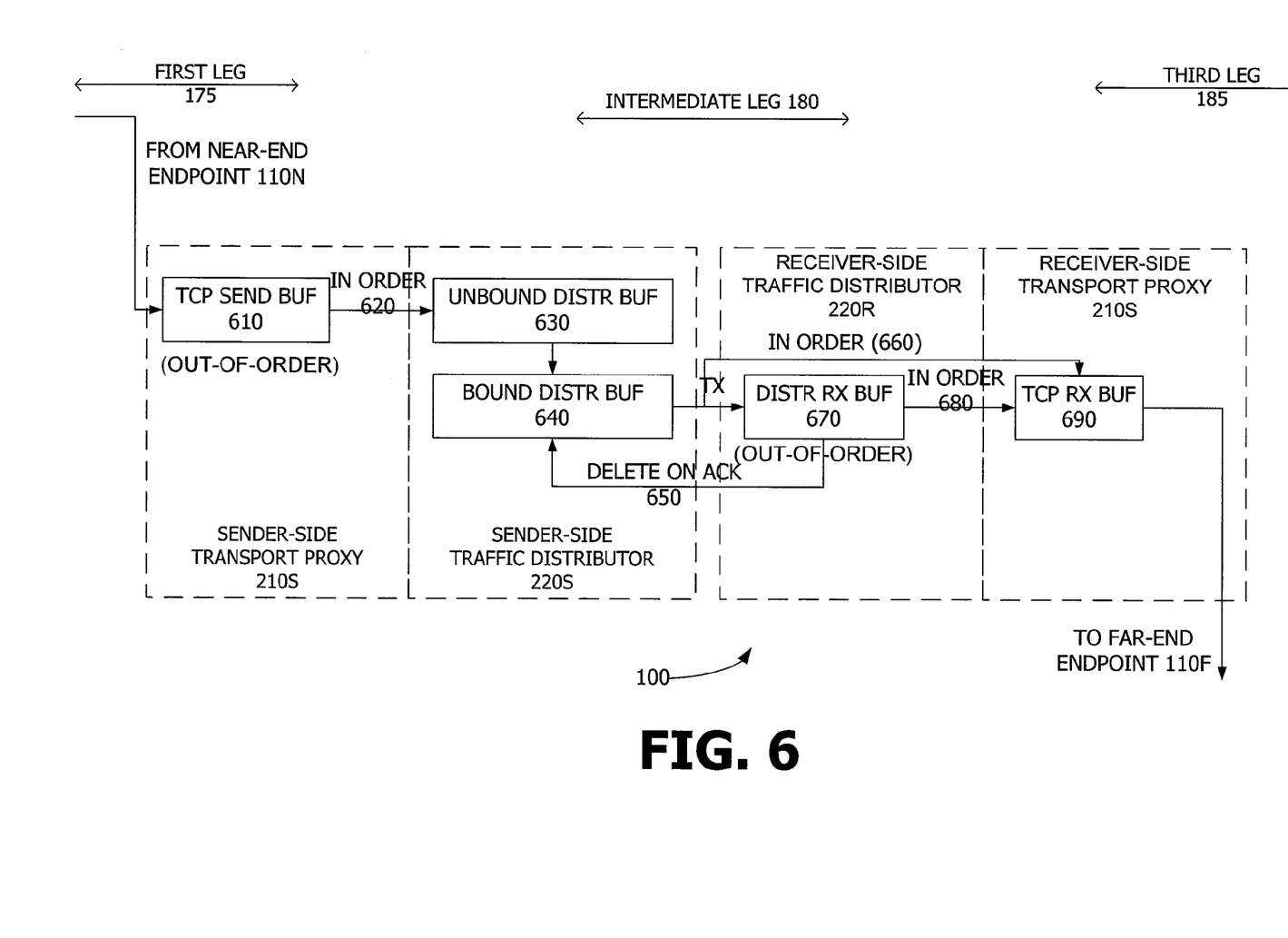
FIG. 6 is a data flow diagram illustrating how buffers are managed by logic for improving performance of transport protocols from FIG. 1

FIG. 6 is a data flow diagram illustrating how buffers are managed by logic for improving performance of transport protocols 160. Sender-side transport-layer proxy 210S maintains a connection-specific send buffer 610 for storing out-of-order packets received on first leg 175 from near-end TCP sender endpoint 110N. Sender-side transport-layer proxy 210S then hands off in-sequence packets (620) to the sender-side multipath traffic distributor 220S, which stores the packets in its unbound buffer 630. Unbound buffer 630 contains packets that have not been assigned to any specific path on intermediate leg 180, and hence have not been transmitted.

Sender-side multipath traffic distributor 220S uses its scheduling algorithm to determine when, and on which path, packets in the unbound buffer are transmitted. Once sender-side multipath traffic distributor 220S makes this scheduling decision, it transfers the specific packet from unbound buffer 630 to a bound buffer 640. The packets in bound buffer 640 are deleted (650) once acknowledgments arrive, conveying successful receipt at receiver-side multipath traffic distributor 220R. In some embodiments, sender-side multipath traffic distributor 220S also maintains virtual buffers (not shown) containing packet sequence numbers of the packets that are assigned to different paths on intermediate leg 180. These virtual buffers assist in performing congestion control and reliable delivery on intermediate leg 180.

Receiver-side multipath traffic distributor 220R hands off in-order packets (660) received from sender-side multipath traffic distributor 220S to receiver-side transport-layer proxy 210R. Receiver-side multipath traffic distributor 220R stores out-of-sequence packets in the out-of-order receive buffer 670, which insures in-order delivery of data to far-end TCP receiver endpoint 110F. On receipt of an in-order packet, multipath traffic distributor 220R checks out-of-order buffer 670 for additional packets that can be handed off (680) to transport-layer proxy 210R. These packets are handed off as long as the corresponding TCP connection is active.

Receiver-side transport-layer proxy 210R stores the received packets from multipath traffic distributor 220R in a connection-specific receive buffer 690. Receiver-side transport-layer proxy 210R transmits these packets on last leg 185 to far-end TCP receiver endpoint 110F, based on scheduling decisions taken in tandem with last-leg congestion control and flow control (described below).

Figure 7:
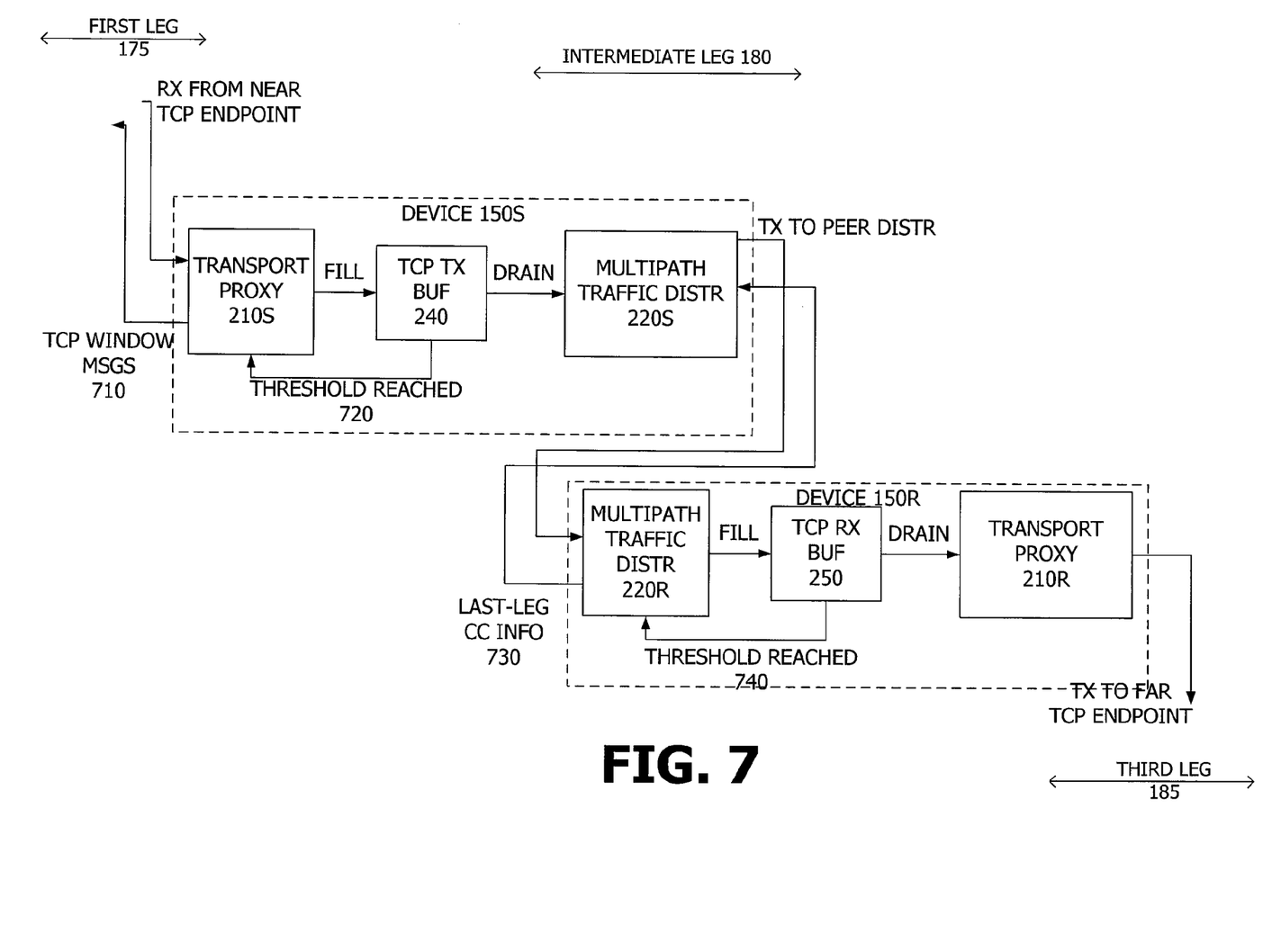
FIG. 7 is a data flow diagram illustrating congestion control in one embodiment of the system from FIG. 1.

FIG. 7 is a data flow diagram illustrating congestion control in one embodiment of system 100. Congestion control on the three legs is performed by three different entities: congestion control on first leg 175 is handled by near-end TCP sender endpoint 110N; congestion control on intermediate leg 180 is performed by the sender-side multipath traffic distributor 220S; and congestion control on last leg 185 is performed by receiver-side transport-layer proxy 210R.

An inventive feature of some embodiments of system 100 is that sender-side transport-layer proxy 210S is indirectly involved in conveying intermediate-leg loop congestion control information back to near-end TCP sender endpoint 110N. This feedback helps to balance the two congestion control loops (first-leg loop and intermediate-leg loop) and to reach a steady-state transmission rate. Sender-side transport-layer proxy 210S uses TCP window messages 710 to convey intermediate-leg congestion information to near-end TCP sender endpoint 110N. The transmission of this intermediate-leg congestion control information by sender-side transport-layer proxy 210S is triggered when send buffer 240 in sender-side device 150S reaches a threshold (720).

Similarly, receiver-side multipath traffic distributor 220R conveys congestion control information for last leg 185 (730) back to the sender-side multipath traffic distributor 220S, in order to stabilize the intermediate-leg and last-leg congestion control loops. In some embodiments, this congestion control information is conveyed in proprietary flow control messages between the multi-path distributors (220S, 220R) which straddle last leg 185. As in the case of intermediate-leg congestion control, transmission of this last-leg congestion control information by receiver-side multipath traffic distributor 220R is triggered when receive buffer 250 in receiver-side device 150R reaches a threshold (740).

Figure 8:
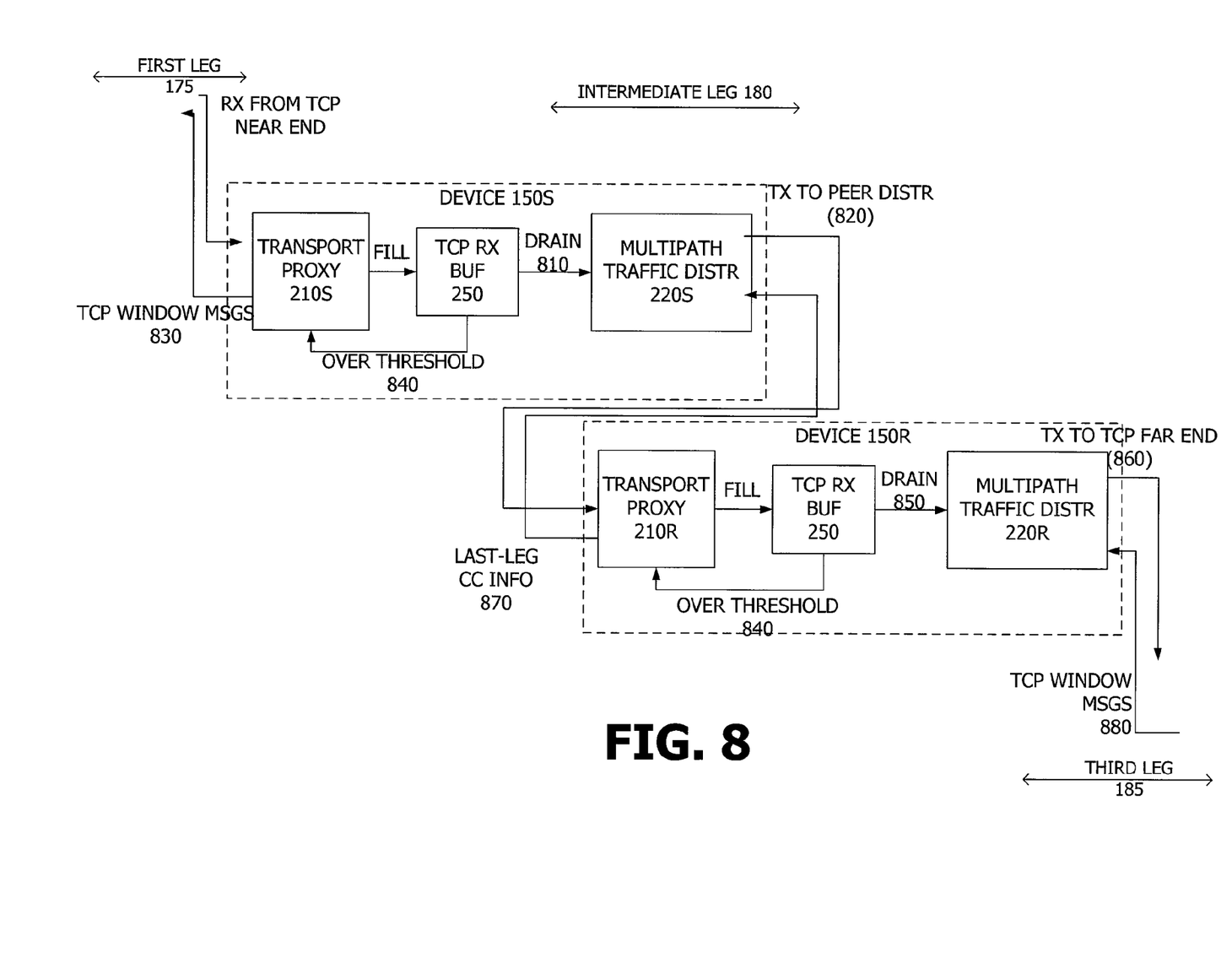
FIG. 8 is a data flow diagram illustrating flow control in one embodiment of the system from FIG. 1.

FIG. 8 is a data flow diagram illustrating flow control in one embodiment of system 100. The three legs of the end-to-end communication path are characterized by three different pairs of senders and receivers, each forming a control loop. These control loops will now be described.

On first leg 175, near-end TCP sender endpoint 110N is the sending entity, and sender-side transport-layer proxy 210S is the receiving entity. The receiver buffer 250 of first leg 175 is drained (810) by the transmission of data (820) by sender-side multipath traffic distributor 220S. This in turn is driven by congestion control on intermediate leg 180 as described earlier. Hence flow control on first leg 175 is achieved using TCP window messages (830) by sender-side transport-layer proxy 210S, based on occupancy (840) of receive buffer 250 on sender-side device 150S.

Intermediate leg 180 is straddled by the sender-side and receiver-side multi-path traffic distributors 220S and 220S, and this receiver buffer is drained (850) by the transmission (860) of packets on last leg 185 by the receiver-side transport-layer proxy 210R. Receiver-side multipath traffic distributor 220R handles the flow control in intermediate leg 180 by conveying buffer-state information (870) to receiver-side multipath traffic distributor 220S.

Finally, last leg 185 has receiver-side transport-layer proxy 210R as the sender and far-end TCP receiver endpoint 110F as the receiving entity. TCP receiver endpoint 110F advertises (880) the receiver buffer window to receiver-side transport-layer proxy 210R and thus controls the rate of transmission of packets on last leg 185 by receiver-side transport-layer proxy 210R.

Figure 9:
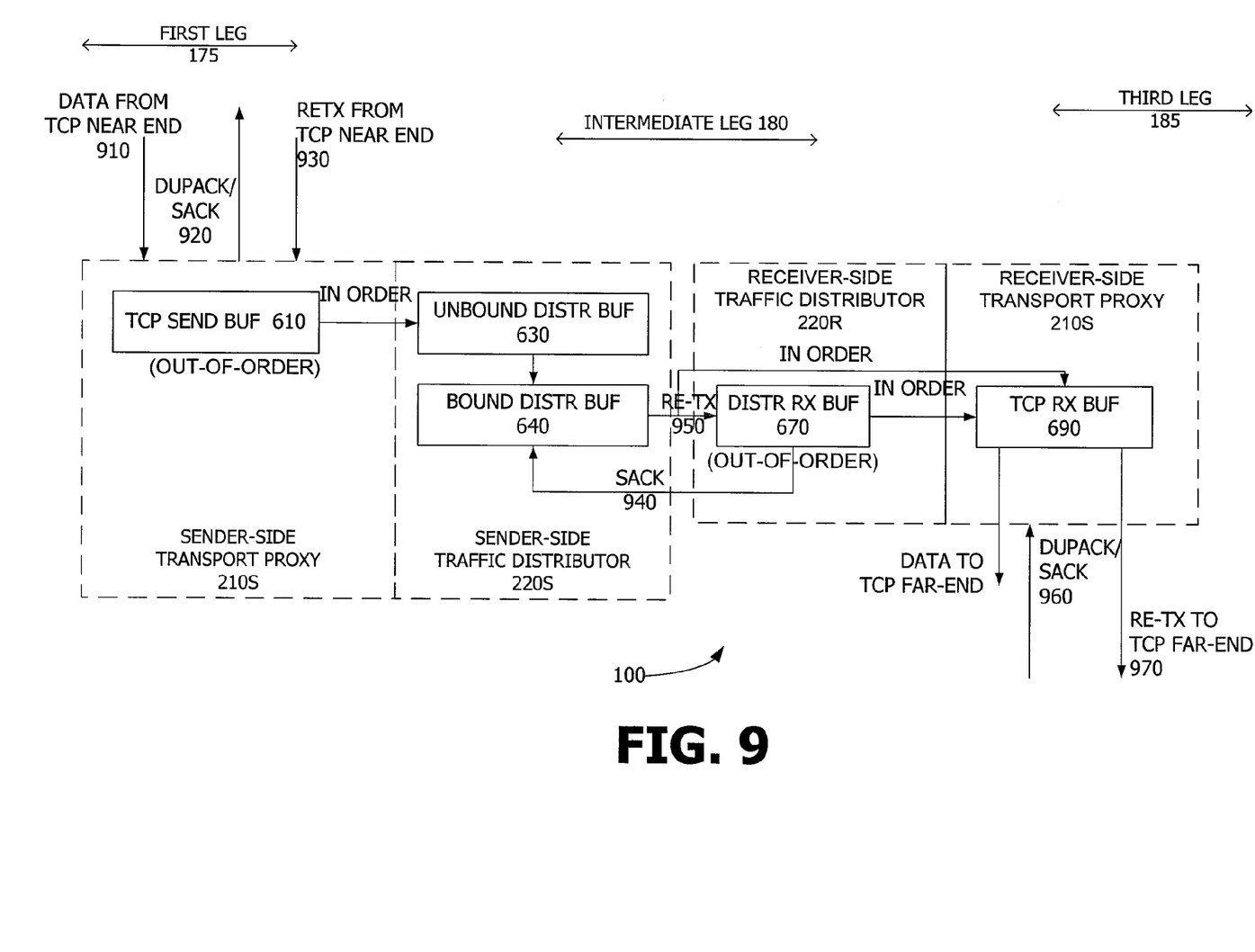
FIG. 9 is a data flow diagram illustrating reliability (QoS) handling in one embodiment of system 100.

FIG. 9 is a data flow diagram illustrating reliability (QoS) handling in one embodiment of system 100. The responsibility of achieving reliable delivery of packets is shared among three different logical entities. Reliability on first leg 175 is handled by near-side TCP sender endpoint 110N, on intermediate leg 180 by multipath traffic distributors at the sender-side and the receiver-side (220S and 220R), and on last leg 185 by transport-layer proxy 210.

Near-side TCP sender endpoint 110N sends (910) data sender-side transport-layer proxy 210S. DUPACKs and SACKs sent (920), in response to this data, by sender-side transport-layer proxy 210S to near-side TCP sender endpoint 110N provide reliability on first leg 175. TCP sender endpoint 110N re-transmits (930) lost packets to sender-side transport-layer proxy 210S. Transport-layer proxy 210S in turn transmits packets that arrive in-sequence from the TCP sender 110N on to sender-side multipath traffic distributor 220S. Multipath traffic distributor 220S then transmits these packets onto intermediate leg 180.

The sender-side and receiver-side multipath traffic distributors 220 are responsible for achieving reliable delivery of packets on the intermediate leg 180, using SACK messages sent (940) from receiver-side multipath traffic distributor 220R to sender-side multipath traffic distributor 220S. (In some embodiment, these SACK messages are multi-level.) Sender-side multipath traffic distributor 220S retransmits (950) packets from bound buffer 640 to receiver-side multipath traffic distributor 220R in response to the loss indicated by acknowledgment messages 940.

In some embodiments, multipath traffic distributors 220 includes a selective reliability feature that allows triggers to be specified for providing reliability for only those connection packets that match the trigger fields. Other packets that are classified for path optimization but not for reliable delivery are directly transmitted from unbound buffer 630 to intermediate leg 180 without storing a copy in bound buffer 640.

Receiver-side multipath traffic distributor 220R performs reliable packet delivery to far-end TCP receiver endpoint 110F. Multipath traffic distributor 220R recognizes DUPACKs and SACK packets received (960) from TCP receiver endpoint 110F, and appropriately retransmits (970) the lost packets, thus achieving reliability.

Several features of the extended transport-layer protocol 165 will be described below. In transparent transport-layer proxy embodiments, network devices 150 perform their operations based on the addition and processing of trailers that are added to the packets received from the TCP endpoints. Thus, the packets flowing between two network devices 150 are similar to the packets sent by the original communicating end-points. Since existing network components use headers to identify and process packets, this inventive feature (along with the bridge functionality described above) allows the extended transport-layer protocol 165 to be transparent to other network components.

Having described the overall operation of logic for improving performance of transport protocols 160, features of several components will now be described in further detail. Both transport-layer proxy 210 and/or multipath traffic distributor 220 maintain state about connection at different granularities. In some embodiments, transport-layer proxy 210 identifies a TCP connection as a unique four-tuple consisting of the source and destination IP address and source and destination ports. When a packet arrives from the near-end TCP sender endpoint 110N on first leg 175, sender-side transport-layer proxy 210S hashes the above-mentioned four-tuple of the packet to identify which connection it belongs to. Connection state is created and maintained by transport-layer proxy 210 on the arrival of the TCP SYN-ACK packet from either near-end TCP sender endpoint 110N or far-end TCP receiver endpoint 110F.

The path optimizer maintains connection based on packet-matching with user-configured triggers. The triggers can be any combination of the five-tuple: source IP address, destination IP address, source port, destination port, and protocol. The path optimizers on both sides of the OUTBOUND leg classify packets into connections based on triggers and maintain the above-described buffers on per-connection basis. Hence we can see that the connections maintained by the TCP optimizer and the path optimizer components, though determined by the arrival of the same set of packets, are based on different fields within the packet.

Trigger manager 440 provides a unified mechanism of choosing connections to be optimized by transport-layer proxy 210 and/or multipath traffic distributor 220. Although trigger manager 440 operates at the control plane between transport-layer proxy 210 and/or multipath traffic distributor 220, it can take different sets of inputs and classifiers for the classification of packets to be optimized by these two components. Trigger manager 440 is also responsible for determining the connections that each packet belongs to. This decision is made in tandem with connection manager 415, which looks at a fixed set of fields in the packet for connection creation, management, and termination.

QoS manager 360 controls the effective service that different connections receive. The triggers described above in connection with FIGS. 4 and 5 are also configured with minimum bandwidth, priority, and weight. If the available bandwidth is greater than the sum of the minimum bandwidths, then the bandwidth is shared in the ratio of the weights. QoS manager 360 works in tandem with multipath traffic distributor 220 to achieve service differentiation among the different flows. The two types of service differentiation achieved by QoS manager 360 are relative service differentiation and absolute service differentiation.

In relative service differentiation, when the weight of a trigger is 'w', then 'w' pipes are created for the trigger for every end-to-end path. All the parameters for the 'w' pipes going through the same path are the same except the pipe number. In this way, each path bandwidth is shared in the ratio of the number of virtual pipes each trigger gets.

In absolute service differentiation, when the bandwidth available is less than the sum of the minimum bandwidths, then absolute bandwidth differentiation automatically kicks in. The trigger with the highest priority is checked to determine whether its configured 'min_bw' is available. If this minimum bandwidth is available, then the triggers are processed in priority order to find the trigger (tmax) with the highest priority whose minimum bandwidth is not achieved. Then the triggers are processed to find the lowest priority trigger (tmin) with a non-zero bandwidth. At this point, the weight of trigger tmax is increased by 1 and the weight of trigger tmin is decreased by 1 and the procedure continues.

In some embodiments, performance monitoring is implemented, in transport-layer proxy 210, in multipath traffic distributor 220, or both. The monitor for transport-layer proxy 210 tracks of performance characteristics (e.g., throughput, loss and delay) experienced by those TCP sessions that have been created and maintained based on the triggers configured for TCP optimization. The monitoring can be performed at different filter granularities namely: pre-configured filters, static filters, dynamic filters and brute-force monitoring filters.

Having described the overall operation of logic for improving performance of transport protocols 160, several features of this protocol will now be described. A person of ordinary skill in the art should understand that these features are generally independent of each other, so that a specific embodiment of the extended transport-layer protocol 165 may include some combination of these features. The extended transport-layer protocol 165 is not required to share memory with other applications and services unlike TCP. The entire memory of the device is can be dedicated for buffering packets of active connections. Further, this large buffer is shared flexibly among multiple active end-to-end connections without any fixed quotas for the connections. TCP's performance is limited in networks with large bandwidth-delay product due to the limit imposed on the maximum outstanding packets in the network. The extended transport-layer protocol improves the performance of end-to-end connections in networks with large bandwidth delay product by eliminating the limitation of small windows and by achieving perfect sharing of the entire memory available to the system for buffering packets of active connections.

As described above, packets are passed between various components for processing. In some embodiments, a zero-copy technique is used which increases the efficiency of the memory use. Zero-copy packet processing uses a NumReferences field in the internal packet representation to track the number of components accessing the packet. Whenever a component processes a packet, it increases the NumReferences field. When the component is finished with processing, it decreases the num_references value. This avoids the need for a copy when passing packets between components.

As described earlier, the arrival of acknowledgements at sender-side multipath traffic distributor 220S results in removing packets from bound buffer 640. Since acknowledgement packets can indicate successful receipt of multiple packets, this can lead to immediately freeing the memory for significant numbers of packets, and this deallocation can be a drain on the system. In order to avoid this, some embodiments of logic for improving performance of transport protocols 160 contain a lazy memory deallocation mechanism. This mechanism stores the sequence numbers of packets to be freed upon the arrival of acknowledgements, then spreads out the actual deallocation of packet memory during subsequent packet transmission cycles, rather than performing a single deallocation of a large amount of memory.

Integration of transport-layer proxy 210 and multipath traffic distributor 220 increases the amount of information carried in the packets traversing last leg 185. This in turn reduces the amount of end-user data that can be carried in each packet. A conventional solution adds extended-transport-protocol headers onto the original packet, then lets the IP layer within intermediate leg 180 take care of the increased segment size, through conventional fragmentation and reassembly mechanisms. This conventional approach is inefficient, given the overhead involved in fragmenting and re-assembling IP packets at in-line speeds. The methods and systems disclosed herein include transmitting an ICMP message back to the sender indicating the MTU that is supported on intermediate leg 180, where this value is the actual MTU reduced by the size of the extended-transport-protocol that is added to packets for traversal over intermediate leg 180. This ICMP message lets the sender know the optimal segment size and thus reduces the overhead of fragmentation and reassembly on intermediate leg 180.

Some embodiments also include an auto-detection feature which helps in identifying peers and the features supported by these peers. Some embodiments support enabling of specific selected features, in which case peer network devices 150 determine what features are enabled in other peers. This feature determination involves sending control messages ("Are you there?") to any unknown host. If a network device 150 is present along the path to the host, that network device 150 responds with another control message ("I am here") indicating the presence and also the features enabled at that network device 150.

Some embodiments use heartbeats as a mechanism for traversing through network address translation (NAT) devices. Conventional NAT traversal uses a central server which co-ordinates communication between peers that are located behind NAT devices. The systems and methods disclosed herein achieve NAT traversal by having a network device 150 send heartbeats from within the private network. These heartbeats punch "holes" in the NAT device, so that subsequent heartbeat messages (and protocol packets) from the peer network device 150 can be delivered as a result of the state creation.

Figure 10:
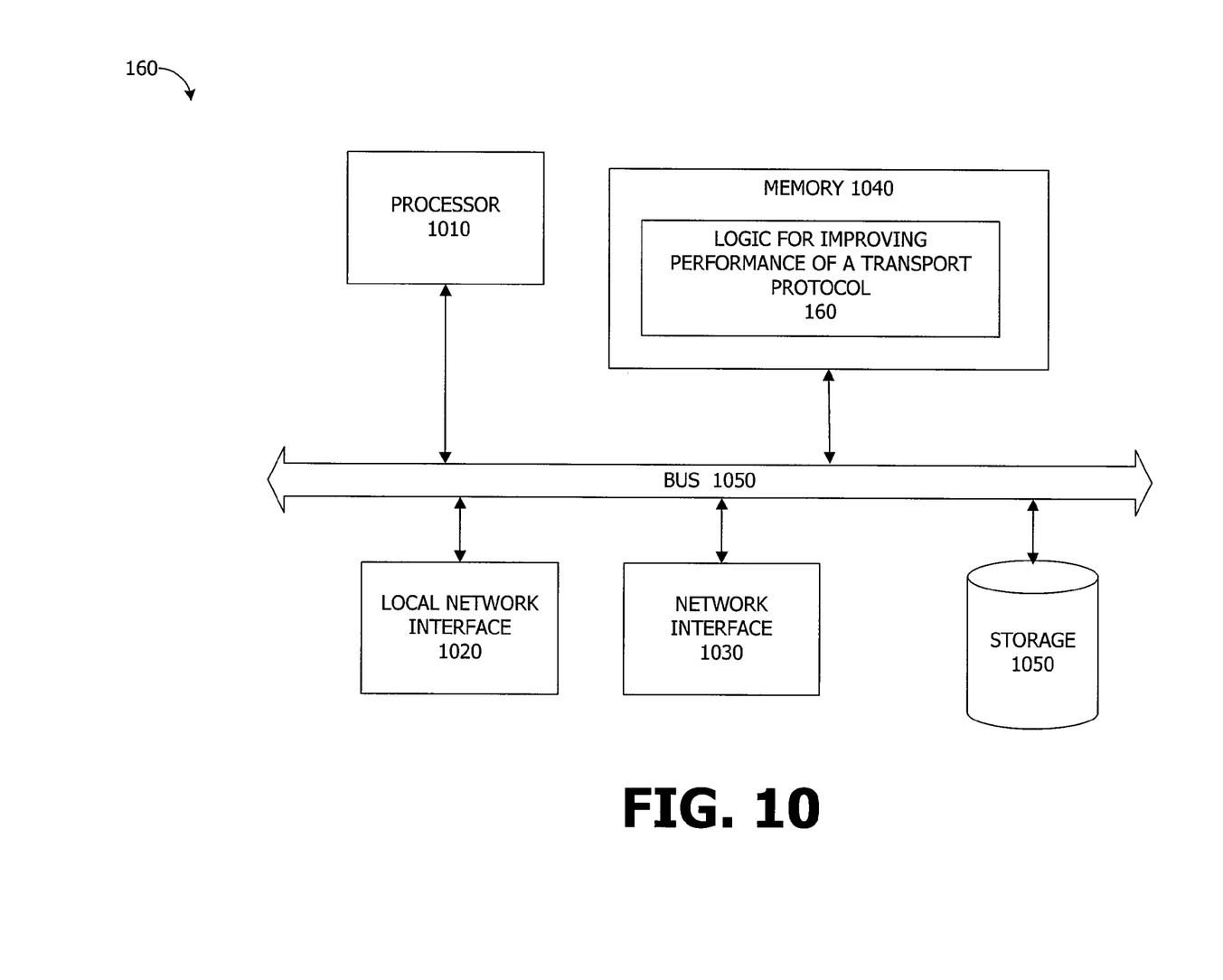
FIG. 10 is a hardware block diagram of the network device from FIG. 1.

FIG. 10 is a hardware block diagram of network device 150 in accordance with one embodiment of the system and method for improving performance of transport-layer protocols disclosed herein. The network device 150 contains a number of components that are well known in the art of data communications, including a processor 1010, a local network interface 1020, a remote local interface 1030, memory 1040, and non-volatile storage 1050. Examples of non-volatile storage include, for example, a hard disk, flash RAM, flash ROM, EEPROM, etc. These components are coupled via bus 11060. Memory 1040 contains logic for improving performance of transport protocols 160 from FIG. 1.

Network device 150 is shown with two network interfaces. Local network interface 1020 is in communication with endpoint 110, and remote local interface 1030 is in communication with network device 150. A person of ordinary skill in the art should understand that the networks interfaces may be of different types, support different medias and speeds, etc. Omitted from FIG. 10 are a number of conventional components, known to those skilled in the art, that are not necessary to explain the operation of network device 150.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A network device comprising:
a transport-layer proxy;
a multi-path traffic distributor coupled to the transport-layer proxy; and
a quality of service (QoS) manager;
wherein the transport-layer proxy is configured to:
receive packets, each associated with a transport-layer connection, from a transport-layer endpoint; and
classify the received packets and deliver at least a portion of the received packets to the multi-path traffic distributor based on the classification;
wherein the multi-path traffic distributor is configured to:
independently assign each of the delivered packets to one of a plurality of data flows; and
transmit each of the delivered packets on an outbound path associated with the assigned data flow; and
wherein the quality of service (QoS) manager configured to set the number of data flows in the plurality of data flows to achieve a quality of service specified by traffic classes in use on the transport-layer connections corresponding to the received packets.

2. The network device of claim 1, wherein the outbound path is one of a plurality of outbound paths.

3. The network device of claim 1, wherein the outbound path a single outbound path associated with all of the data flows.

4. The network device of claim 1, wherein the QoS manager is further configured to set the number of data flows to produce relative service differentiation.

5. The network device of claim 1, wherein the QoS manager is further configured to set the number of data flows to produce absolute service differentiation.

6. A network device comprising:
a transport-layer proxy; and
a multi-path traffic distributor coupled to the transport-layer proxy, wherein the transport-layer proxy is configured to:
receive packets, each associated with a transport-layer connection, from a transport-layer endpoint;
store the received packets in buffers associated with the corresponding connections;
wherein the multi-path traffic distributor is configured to:
transmit packets from the buffers to an outbound path;
receive congestion control information from a peer multi-path traffic distributor indicating congestion on the outbound path;
wherein the transport-layer proxy is further configured to:
transmit control packets to the transport-layer endpoint based on occupancy of the buffers, wherein the control packets indicate the congestion control information; and
wherein the multi-path traffic distributor is further configured to:
receive information from the peer multi-path traffic distributor indicating congestion on a path between the peer multi-path traffic distributor and a second transport-layer endpoint, wherein receiving the information is based on occupancy of buffers in the peer multi-path traffic distributor.

7. A network device comprising:
a transport-layer proxy; and
a multi-path traffic distributor coupled to the transport-layer proxy, wherein the transport-layer proxy is configured to:
receive packets, each associated with a transport-layer connection, from a transport-layer endpoint; and
store the received packets in buffers associated with the corresponding connections;
wherein the multi-path traffic distributor is configured to:

transmit packets from the buffers to an outbound path in response to congestion control information received from a peer multi-path traffic distributor indicating congestion on the outbound path; and wherein the transport-layer proxy is further configured to:
transmit flow control packets to the transport-layer endpoint based on occupancy of the buffers; and wherein the multi-path traffic distributor is further configured to:
receive information from the peer multi-path traffic distributor indicating receive buffer occupancy in the peer multi-path traffic distributor; and
transmit packets from the buffers to an outbound path in response to the information indicating receive buffer occupancy.

8. A network device comprising:
a transport-layer proxy; and
a multi-path traffic distributor coupled to the transport-layer proxy, wherein the transport-layer proxy is configured to:
receive packets, each associated with a transport-layer connection, from a transport-layer endpoint; and
deliver each of the received packets to the multi-path traffic distributor if the packet is in sequence; and
wherein the multi-path traffic distributor is configured to:
store each of the delivered packets in an unbound buffer which is not assigned to an outbound path; and
transmit each of the delivered packets on an outbound path;
wherein the multi-path traffic distributor is further configured to:
receive packets from a peer multi-path traffic distributor;
store received packets that are not in sequence in an out-of-order buffer; and
deliver packets from the out-of-order buffer to the transport-layer proxy when additional packets have been received from the peer to produce an in-order sequence; and wherein the transport-layer proxy is further configured to:
store packets delivered from the out-of-order buffer into a receive buffer; and
transmit packets stored in the receive buffer to the transport-layer endpoint.

9. The network device of claim 8, wherein a packet data structure used to store one of the received packets includes a number-of-references field that is increased as each component begins processing of the packet and is decreased as each component completes processing of the packet.

10. The network device of claim 8, further comprising:
logic configured to receive an acknowledgment for a transmitted packet, the acknowledgement including sequence number of the transmitted packet;
logic configured to store the sequence number in response to the received acknowledgment; and
logic configured to delay freeing of memory associated with the transmitted packet to a time later than the received acknowledgment.

11. The network device of claim 8, wherein the multi-path traffic distributor is further configured to:
determining a maximum transmission unit (MTU) for the outbound path;
setting a local MTU to be the MTU for the outbound path reduced by a size of an extended transport-layer protocol header used by the multi-path traffic distributor; and
notifying a peer network device on the outbound path of the local MTU.

12. The network device of claim 8, wherein the network device further comprises:
logic configured to detect presence and capabilities of a peer network device on the outbound path.

13. The network device of claim 8, wherein the network device further comprises:
logic configured to transmit heartbeat messages to a peer network device on the outbound path.

* * * * *